US008113389B2

(12) United States Patent
Lewis et al.

(10) Patent No.: US 8,113,389 B2
(45) Date of Patent: Feb. 14, 2012

(54) ANTI DRIP FLUID DISPENSER

(75) Inventors: Richard Paul Lewis, Marietta, GA (US); Malcolm C. Halls, Alpharetta, GA (US); Paul Francis Tramontina, Harleysville, PA (US); Huoxian Xie, ShenZhen (CN); Yutai Guo, ShenZhen (CN); Charles Agnew Osborne, Jr., Cumming, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 568 days.

(21) Appl. No.: 12/329,904

(22) Filed: Dec. 8, 2008

(65) Prior Publication Data

US 2010/0140300 A1 Jun. 10, 2010

(51) Int. Cl.

| | |
|---|---|
| ***B67D 7/76*** | (2010.01) |
| ***B65D 37/00*** | (2006.01) |
| ***B65D 88/54*** | (2006.01) |
| ***B65D 5/72*** | (2006.01) |
| *G01F 13/00* | (2006.01) |

(52) U.S. Cl. ..................... 222/190; 222/321.3; 222/207; 222/571

(58) Field of Classification Search ............... 222/321.3, 222/375, 207, 571, 252, 255, 109
See application file for complete search history.

(56) References Cited

U.S. PATENT DOCUMENTS 1,768,909 A * 7/1930 Iddings ......................... 222/375
2,593,591 A * 4/1952 Menkin et al. ................ 222/205
4,316,555 A 2/1982 Smith
4,345,627 A 8/1982 Cassia
4,391,308 A 7/1983 Steiner
4,391,309 A 7/1983 Steiner
4,429,812 A 2/1984 Steiner et al.
4,678,107 A 7/1987 Ennis, III
4,883,202 A * 11/1989 Wahl ............................ 222/109
5,115,945 A 5/1992 Ruck
5,305,916 A 4/1994 Suzuki et al.
5,443,569 A * 8/1995 Uehira et al. ................. 222/190
5,482,187 A 1/1996 Poulsen et al.
5,549,223 A 8/1996 Hori
5,570,819 A * 11/1996 Uehira et al. ................. 222/190
5,806,721 A 9/1998 Tada
5,938,079 A 8/1999 Wacker et al.
6,142,342 A * 11/2000 Lewis ........................... 222/180
6,446,840 B2 9/2002 Ophardt et al.
6,929,150 B2 * 8/2005 Muderlak et al. ................. 222/1
7,004,356 B1 2/2006 Sayers
7,066,355 B2 * 6/2006 Lewis et al. ................ 222/145.5
7,246,723 B2 * 7/2007 Santagiuliana ............... 222/209
7,267,251 B2 9/2007 Ophardt
7,681,765 B2 * 3/2010 Muderlak ..................... 222/571
7,726,517 B2 * 6/2010 Kennedy et al. .............. 222/108
(Continued)

FOREIGN PATENT DOCUMENTS

GB 962762 A 7/1964

*Primary Examiner* — Kevin P Shaver
*Assistant Examiner* — Nicholas Weiss
(74) *Attorney, Agent, or Firm* — Nancy M. Klembus; Ralph H. Dean, Jr.

(57) ABSTRACT

The present invention provides a dispenser for dispensing a fluid which has an anti-drip feature. To achieve this anti-drip feature, the dispenser is provided with a suck back mechanism which is separate and independent from a pump in the dispenser. The suck back mechanism uses a resilient member capable of storing fluid.

21 Claims, 12 Drawing Sheets

U.S. PATENT DOCUMENTS

| | | | | |
|---|---|---|---|---|
| 7,757,899 | B2 * | 7/2010 | van der Heijden | 222/190 |
| 7,780,039 | B2 * | 8/2010 | Criswell et al. | 222/108 |
| 7,886,937 | B2 * | 2/2011 | Py | 222/321.7 |
| 2001/0042761 | A1 | 11/2001 | Ophardt et al. | |
| 2005/0284887 | A1 * | 12/2005 | Lewis et al. | 222/181.3 |
| 2005/0284888 | A1 | 12/2005 | Rhodenbaugh et al. | |
| 2006/0108380 | A1 * | 5/2006 | Ciavarella | 222/321.9 |
| 2006/0237484 | A1 | 10/2006 | Workum | |
| 2007/0000941 | A1 * | 1/2007 | Hadden et al. | 222/52 |
| 2007/0051748 | A1 | 3/2007 | Yates et al. | |
| 2007/0241137 | A1 | 10/2007 | Willis et al. | |
| 2007/0251953 | A1 * | 11/2007 | Criswell et al. | 222/105 |
| 2008/0169311 | A1 * | 7/2008 | Van Der Heijden | 222/190 |
| 2009/0101679 | A1 * | 4/2009 | Muderlak | 222/375 |
| 2009/0236371 | A1 * | 9/2009 | van der Heijden | 222/190 |
| 2010/0133300 | A1 * | 6/2010 | van der Heijden et al. | 222/190 |
| 2010/0140300 | A1 * | 6/2010 | Lewis et al. | 222/321.3 |
| 2010/0200615 | A1 * | 8/2010 | Ciavarella | 222/190 |
| 2010/0320232 | A1 * | 12/2010 | van der Heijden et al. | 222/135 |
| 2011/0127291 | A1 * | 6/2011 | Tramontina et al. | 222/1 |

* cited by examiner

ANTI DRIP FLUID DISPENSER

FIELD OF THE INVENTION

The present invention generally relates to a fluid dispenser having an anti-drip feature.

BACKGROUND OF THE INVENTION

Fluid dispensers are known in the art for dispensing various viscous liquid and foam compositions. The viscous liquid and foam compositions are typically soaps, shampoos, creams, or lotions and are often found in public restrooms, restrooms in office buildings, and the like. One problem facing these fluid dispensers is at the end of a dispensing cycle a small portion of the fluid being dispense from the dispenser may remain at the exit port of the dispensing nozzle. This small portion of the fluid being dispensed can result in a condition called "stringing", in which the small portion of the fluid remains attached to the fluid dispensed to the user. For example, when the fluid is dispensed into the user's hand, the small portion of fluid remains attached to both the fluid dispensed in the user's hand and the exit port of the nozzle. As the user withdraws their hand away from the exit port, the small portion of the fluid remains attached to both the user's hand and the exit port of the nozzle, creating an elongated string-like formation of the fluid. Stringing is especially a problem with foam compositions. Stringing can confuse a user, causing the user to focus on terminating the string, rather than the job at hand, for example, washing one's hands.

Alternatively, the small portion of the fluid may remain solely at the exit port of the nozzle. As gravity or other forces act on this small portion of the fluid, the small portion of the fluid may drip from the exit port of the nozzle onto a structure located beneath the exit port, such as a floor, a countertop, or sink. Alternatively, the small portion of the fluid may from a "string" of the fluid form the exit port to the structure beneath the exit port of the nozzle. In each of these situations, the viscous liquid dispenser gives the appearance of wasting the fluid and/or being of poor quality. In addition, having the fluid on surface beneath the nozzle of the dispenser and/or hanging from the exit port of the dispenser is often unsightly, creating a perception of an unclean restroom, and/or presenting a slip hazard to users of the restroom, when the fluid falls to the floor of the restroom.

In response to the dripping and stringing problems, pumps have been developed that have a suck back mechanism. This suck back mechanism creates a suction which draws the small portion of undispensed fluid away from the exit port. The prior art suck back mechanisms where built directly into the pump which draws the fluid from a reservoir. These mechanisms used the recovery/recharging cycle of the pump to draw the small portion of the undispensed fluid back towards the pump. One problem with this configuration is that the opposite forces are being applied to the pump at the same time, which may result in the pump with the suck back mechanism built into the pump operating in a manner which is undesirable. That is, the pump is caused to draw fluid from the reservoir at the same time the pump is drawing the portion of the undispensed fluid from the exit port of the dispensing nozzle. These opposite forces may make the pump susceptible to sticking or ineffectively drawing the fluid from the reservoir. As a result, to ensure proper operation of the pump, the prior suck back mechanisms have a complex structure.

There is a need in the art for a fluid dispenser with a suck back mechanism which operates independently from the pump mechanism and which has a relatively simple structure.

SUMMARY OF THE INVENTION

Generally stated, the present invention provides a dispenser for dispensing a fluid. The dispenser has a reservoir, a pump, a suck back mechanism, and a dispensing end. The reservoir is capable of holding a fluid which is to be dispensed from the dispensers. The pump is in communication with the reservoir. The pump has an inlet, an outlet and a recovery means. In addition, the pump has an idle or rest stage, a discharging stage, in which a shot of the fluid is expelled from the pump through the outlet, and a charging stage, in which a shot of the fluid is drawn from the reservoir through the inlet into the pump. The recovery means returns the pump to the idle stage from the discharging stage and through the charging stage. The suck back mechanism is separate from the pump. The suck back mechanism has at least one resilient member capable of storing fluid, a first opening, and a second opening. The first opening of the suck back mechanism is connected to the outlet of the pump and the resilient member is positioned between the first opening and the second opening of the suck back mechanism. The dispensing end of the dispenser has an exit port which allows the fluid to be dispensed from the dispenser and the dispensing end is connected, directly or indirectly, to the second opening of the suck back mechanism. At the end of the discharging stage of the pump, undispensed fluid remains between the dispensing end and the second opening of the suck back mechanism and a portion of the undispensed fluid is drawn into resilient member, independent of the recovery means of the pump.

In one embodiment of the present invention, the present invention provides a dispenser where the resilient member is prepared from an elastomeric material. The resilient member is a hollow member having a hollow portion and the hollow portion is capable of storing fluid. The resilient members of the present invention may be shaped to effectively store, intake and release fluids. In one particular embodiment of the present invention, the resilient members may have a corrugated shape or truncated cone shape.

In a further embodiment of the present invention, the suck back mechanism may be a single resilient member or a plurality of resilient members. In one particular embodiment, there are two resilient members present in the suck back mechanism.

In another embodiment of the present invention, the pump recovery means may be a compressible member. One example of a compressible member that may operate as the pump recovery means is a spring.

In another embodiment of the present invention, the suck back mechanism is a body having a first opening, a second opening, and a primary fluid pathway between the first and second opening. This primary pathway connects the first and second openings to one another. Also present is at least one secondary pathway having a first end and a second end, wherein the resilient member is located at the second end of the secondary pathway and the first end of the secondary pathway is located along primary fluid pathway.

In an additional embodiment of the present invention, the pump further has a housing having a fluid chamber comprising an interior wall, a piston positioned within the fluid chamber and a piston which is telescopingly movable within the fluid chamber. The piston creates a seal with the interior wall of the fluid chamber. The pump further has an inlet valve located at or near the inlet of the pump, and an outlet valve located at or near the outlet of the pump. In yet a further embodiment of the present invention, the housing further forms a second chamber having an interior wall. The piston is telescopingly movable within the second chamber and creates a seal with the interior wall of the second chamber. This second chamber has a second inlet and a second outlet, wherein the second outlet is located at or near the outlet of the pump and the second inlet is positioned within the pump such that it is on a side of the pump which does not come into contact with the fluid within the reservoir. In one particular embodiment of the present invention, the second inlet is an air inlet, which is adapted to allow atmospheric air to enter the second chamber of the pump, but will not allow atmospheric air in the second chamber to escape through the second inlet.

By providing the dispenser of the present invention, drawbacks of the dispensers with suck back mechanisms described above are minimized or eliminated.

DEFINITIONS

It should be noted that, when employed in the present disclosure, the terms "comprises", "comprising" and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As used herein, the term "fluid" is intended to mean a body of material which is flowable at or about room temperature and pressure. The term is intended to mean gases, liquids and mixtures thereof as well as these materials that contain solids or particles. The term "precursor to the fluid" is intended to mean a material that forms a fluid when expelled from the dispenser. For example, a liquid may be a precursor to a foam dispensed from the dispenser.

As used herein, the term "charging stage" is intended to mean a phase of the pump in which fluid is being drawn from the reservoir, and, when the pump is a foaming pump, air being drawn into the air chamber of the pump.

As used herein, term "discharging stage" is intended to mean a phase of the pump in which fluid is being expelled from the pump through the outlet of the pump, and, when the pump is a foaming pump, air is being forced from the air chamber of the pump.

As used herein, the terms "idle stage" or "rest stage" is intended mean a phase of the pump in which the pump is neither charging or discharging a fluid.

DETAILED DESCRIPTION OF THE INVENTION

In the following detailed description of the present invention, reference is made to the accompanying drawings which form a part hereof, and which show by way of illustration, specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the present invention. The following detailed description is, therefore, not to be taken in a limiting sense, and the scope of the present invention is defined only by the appended claims, along with the full scope of equivalents to which such claims are entitled.

Figure 1:
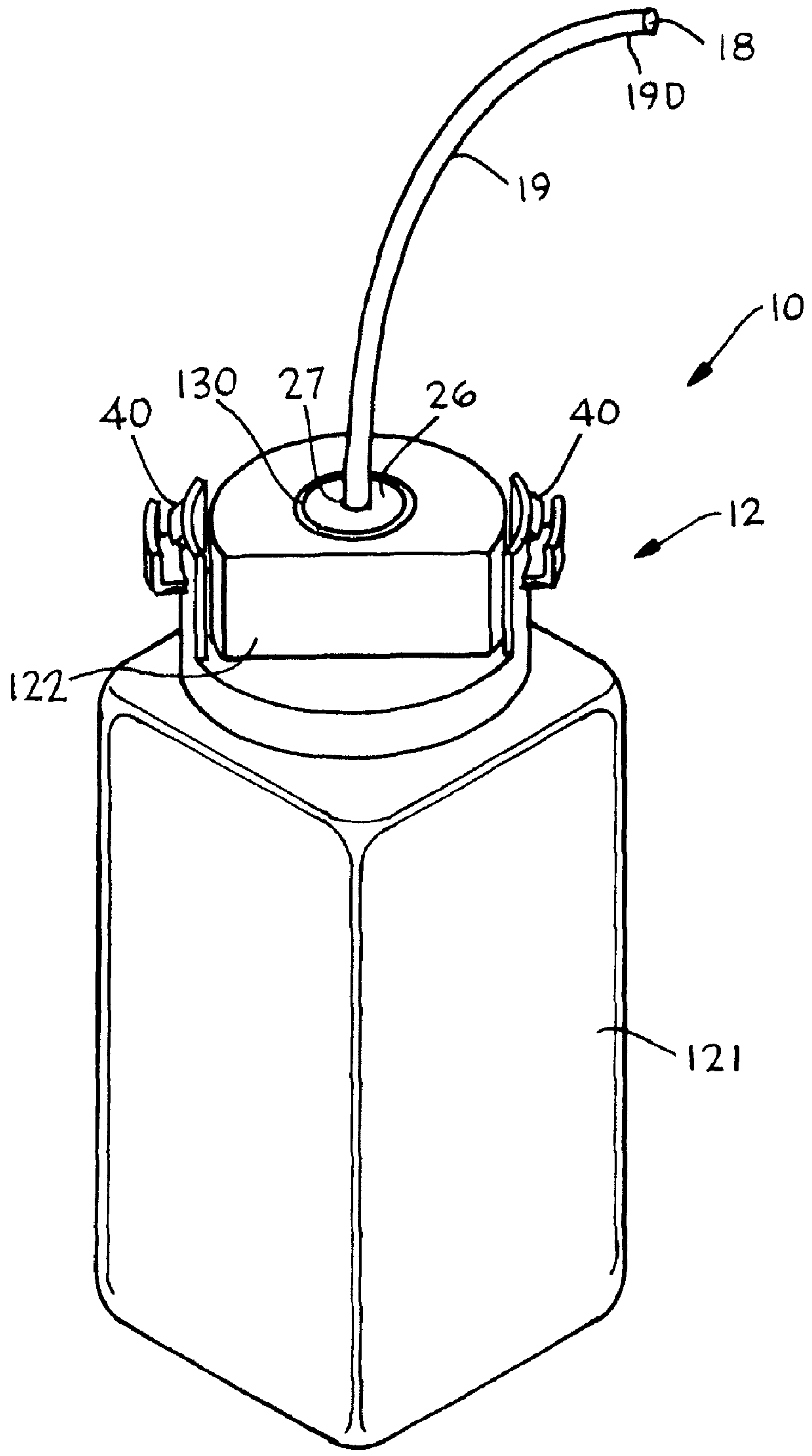
FIG. 1 shows a perspective view a dispenser for dispensing a fluid having a suck back mechanism.
Figure 2:
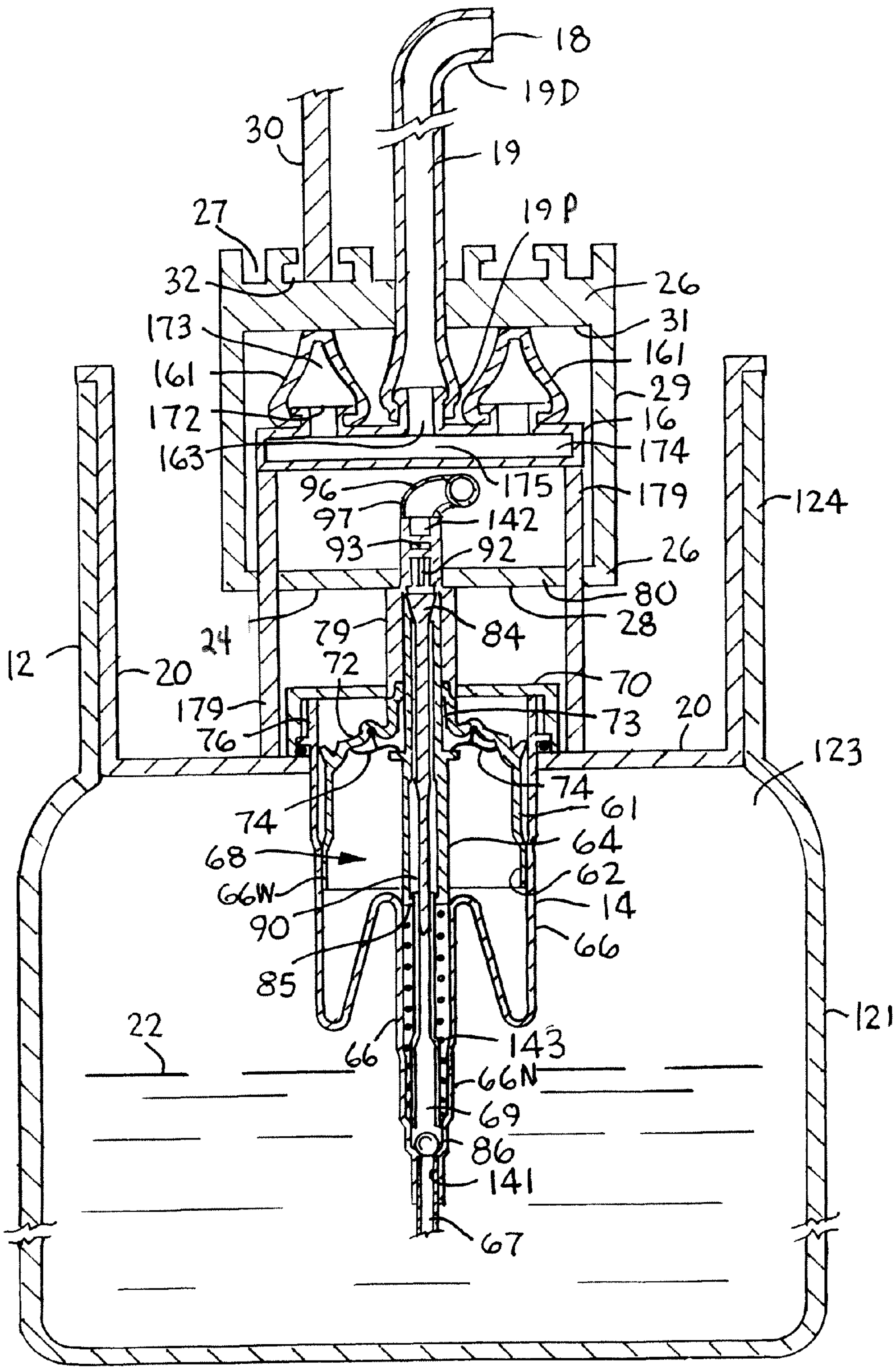
FIG. 2 is a cut-away view of a pump and suck back mechanism usable in a dispenser.
Figure 3:
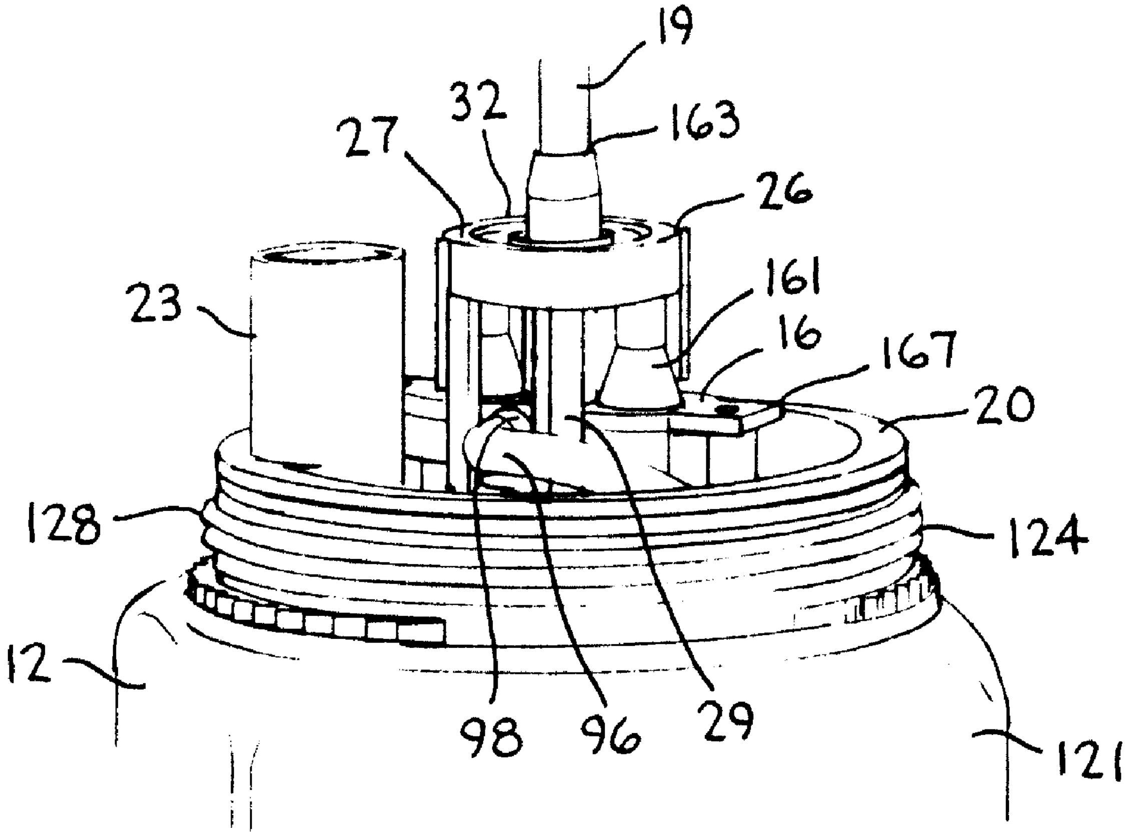
FIG. 3 shows a perspective view of the top portion of the dispenser with the cover removed.

Referring to FIGS. 1, 2, and 3, provided by the present invention is a dispenser 10 for dispensing a fluid. Generally, the dispenser 10 has a reservoir 12, a pump 14 (shown in FIG. 2), a suck back mechanism 16 and a dispensing end 18. The reservoir 12 is capable of holding a fluid 22 (shown in FIG. 2) which is to be dispensed from the dispenser 10. The pump 14 is in communication with the reservoir 12 such that the pump 14 may draw the fluid from the reservoir 12 into the pump, through dip tube 67.

In one embodiment, referring to FIGS. 1 and 3, reservoir 12 includes a main container 121 and a top portion 122. FIG. 1 shows the top portion 122 on the main container 121 and FIG. 3 shows the top portion removed from the main container 121, so that the internal works of the reservoir may be viewed. The main container 121 serves to hold and contain the fluid or the precursor to the fluid that is to be dispensed from the dispenser 10 and will generally have an opening, which is not shown in FIGS. 1 and 3. The main container may also have a neck 124 near the opening, wherein the neck 124 of the main container forms the opening in the main container 121. Generally, the top portion 122 is attachable to the main container 121 at neck 124 of the main container 121. The top portion 122 may be secured to the main container 121 in a manner such that the top portion 122 is removably secured to the main container 121 or such that the top portion 122 is permanently secured to the main container 122. For example, the top portion 122 may be sealed to main container 121 using ultrasonic welding, adhesive or other suitable means of effecting a permanent attachment of the top portion 122 to the main container 121. If it is desirable that the top portion 122 is removable from the main container 121, the top portion 122 could be mated to the main container 121 using known methods, such as providing threads (not shown) on the top portion 122 and complementary threads 128 on the main container 121, as is shown in FIG. 3. Other similar methods could be used to removably secure the top portion 122 to the main container 121.

Located within the main container 121 is a pump 14, shown in FIG. 2. As shown in FIG. 2, the pump is located in the opening 123 of the main container 121, generally in the neck 124 of the main container. It is also possible that the pump 14 may be located in the top 122 of the reservoir 12, or located at the bottom of the main container 121. For the purposes of describing the present invention, the pump will be described as being generally located in the neck 124 of the main container 121. Generally speaking, the pump 14 has an inlet 141, an outlet 142 and a recovery means 143. As with most pumps, the pump 14 has an idle stage, a discharging stage, and a charging stage. In the idle stage, which is shown in FIG. 2, the pump 14 mechanism is at rest and is not actively charging or discharging the fluid. The discharging stage of the pump is a stage in which a shot of the fluid is expelled from the pump 14 through the outlet 142 of the pump. In the charging stage of the pump 14, a shot of the fluid 22 is drawn from the reservoir 12 through the inlet 141 into the pump 14. The recovery means 143 allow the pump 14 to return to the idle stage from the end of the discharging stage. As the pump 14 is returning to the idle stage from the end of the discharging stage, the pump 14 is in the charging stage. Further details of a pump 14 usable in the present invention will be described below.

The suck back mechanism 16 is separate and distinct element from the pump 14. Generally described, a suck back mechanism 16 usable in the present invention is shown in FIGS. 5 and 5A in an exploded view. The suck back mechanism 16 has at least one resilient member 161 capable of storing fluid, a first opening 162 and a second opening 163 (shown in FIGS. 3, 4, 5 and 5A). The resilient member 161 is positioned between the first opening 162 and the second opening 163 of the suck back mechanism 16. The dispensing end 18 of the dispenser 10 allows the fluid to be dispensed from the dispenser 10 and the dispensing end 18 is connected to the second opening 163 of the suck back mechanism 16. At the end of the discharging stage of the pump 14, undispensed fluid remains between the dispensing end 18 and the second opening 163 of the suck back mechanism 16 and a portion of the undispensed fluid is drawn into resilient member 161, which prevents the undispensed portion from dripping out of the dispensing end 18 and helps prevent stringing of the fluid dispensed to the user with the undispensed fluid.

The suck back mechanism 16 may operate independently from the pump 14 or may operate in conjunction with the pump 14. When operated separately from the pump, the suck back mechanism does not rely upon the recovery means 143 of the pump. When operated in conjunction with the pump, the pump's recovery means 143 assist recovery of the resilient members during the charging stage of the pump. The first opening 162 of the suck back mechanism 16 is connected to the outlet 142 of the pump 14.

Figure 4:
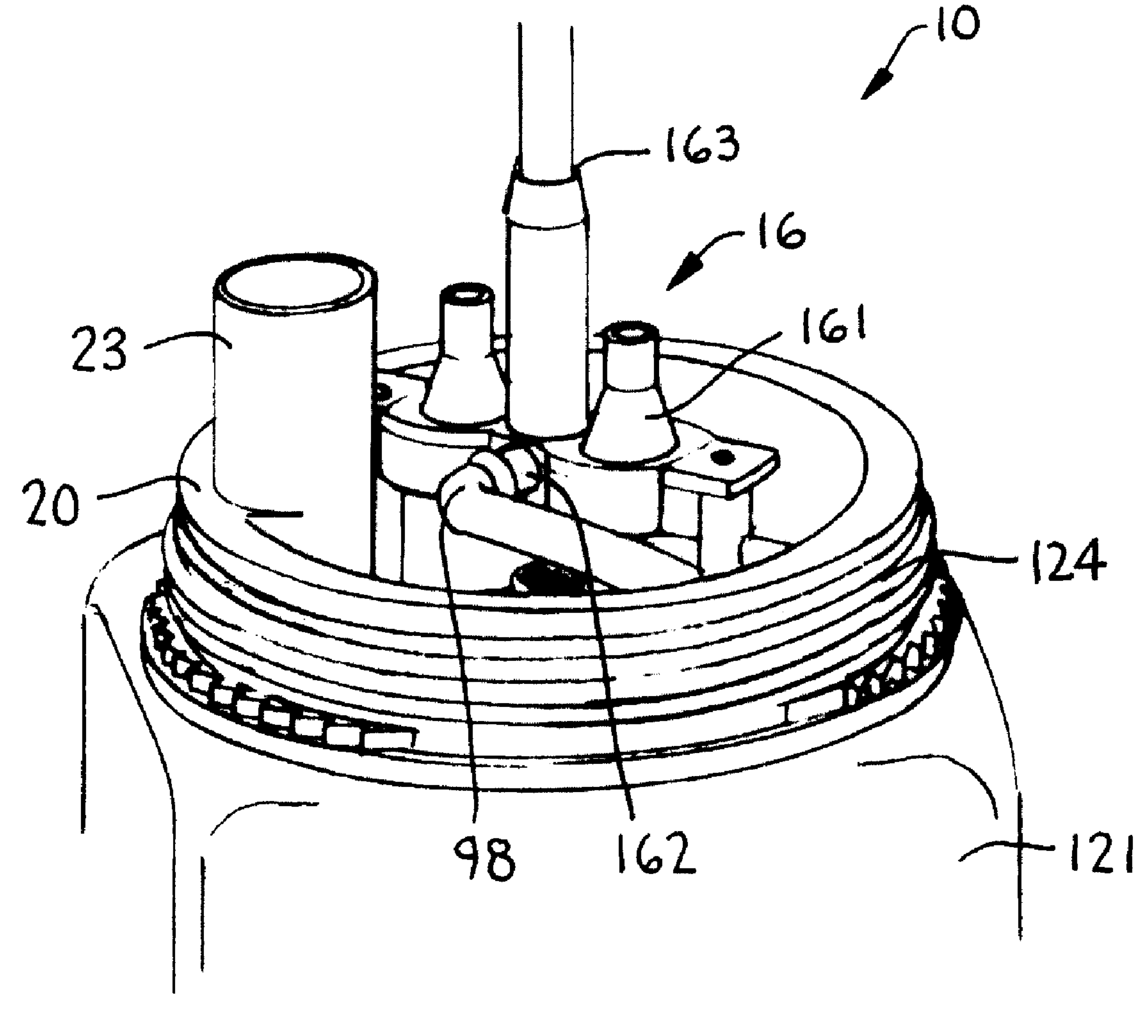
FIG. 4 shows a perspective view of the top portion of the dispenser with the cover and the pump actuator removed.
Figure 5:
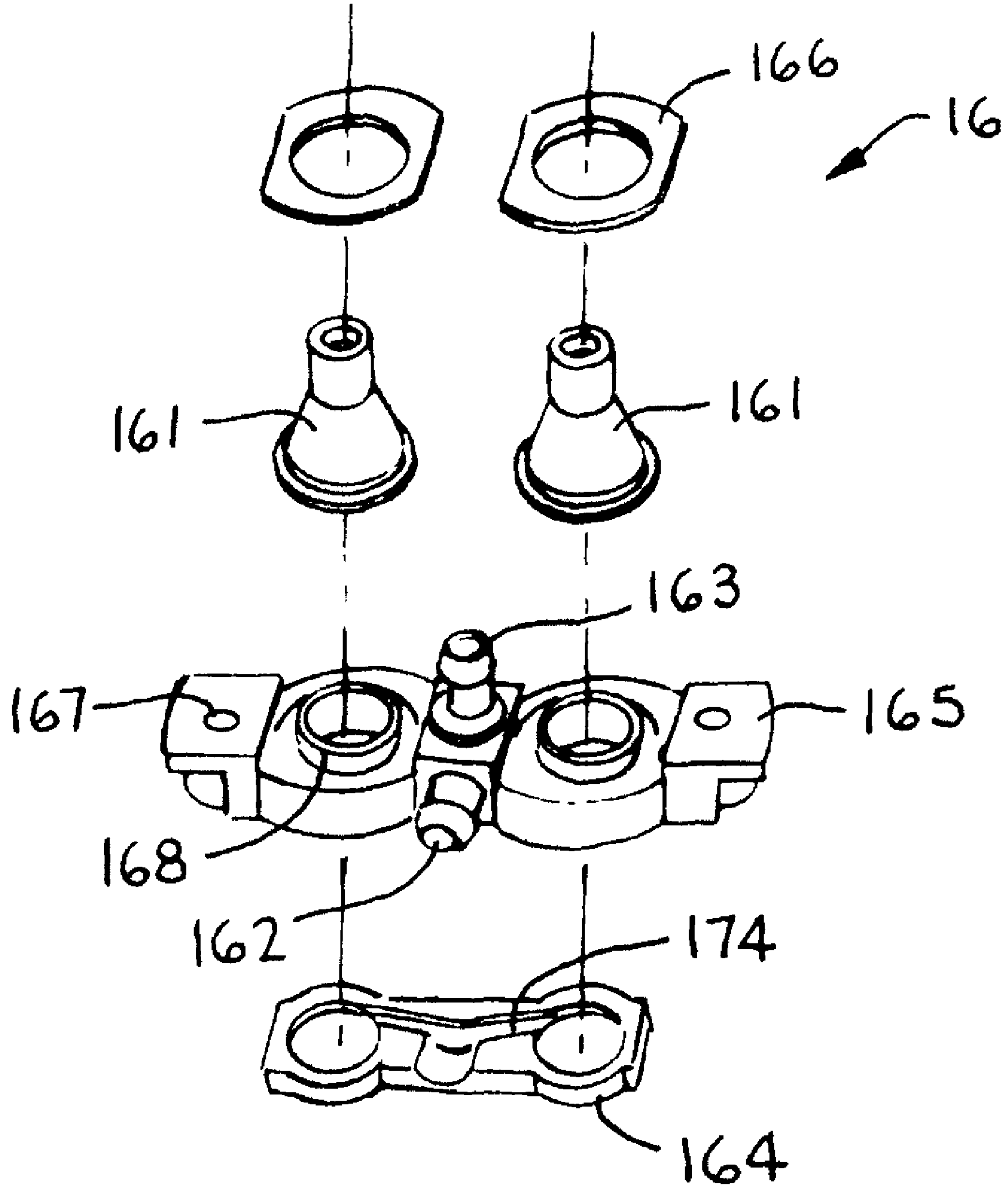
FIGS. 5 and 5A each show an exploded view of a suck back mechanism usable in the present invention.
Figure 5A:
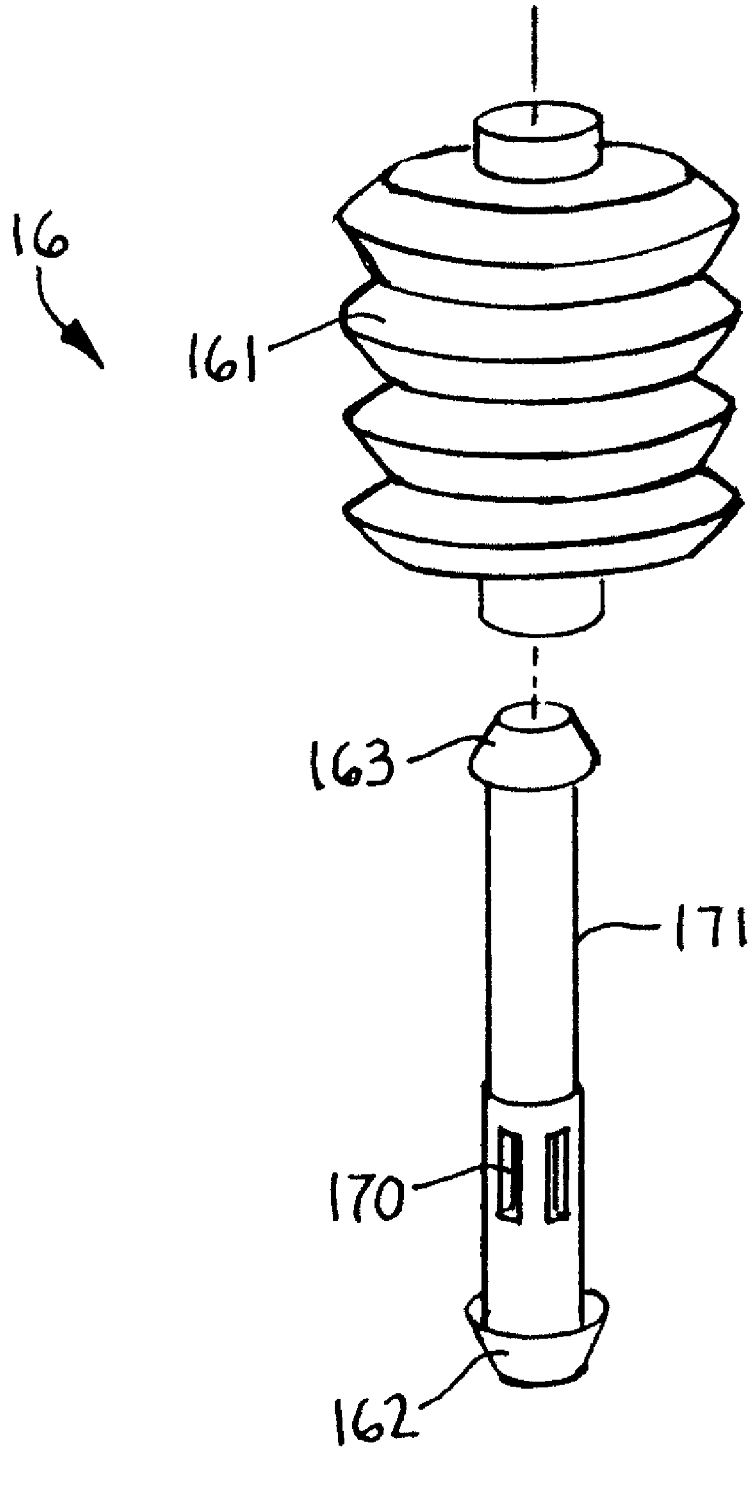

As shown in FIG. 2, the dispenser 10 may be provided with a pump mounting element 20, which is also shown in FIGS. 3 and 4. This pump mounting element 20 may be used to hold and/or secure the pump 14 and the suck back mechanism 16 within the dispenser. The pump mounting element 20 fits into the opening 123 of the main container 121, which is shown in FIGS. 2, 3 and 4 and may be permanently mounted in the opening or removably mounted in the opening. Alternatively, the pump mounting element 20 may be associated with the top portion 122 of the dispenser. That is, the pump mounting element 20 may be removably connected to the top portion 122 of the reservoir. In another alternative configuration, the pump mounting element 20 may be permanently connected with the top portion 122 of the dispenser such that the pump mounting element 20 forms a bottom surface of the top portion 122. Alternatively, the pump device 12 may be housed within the main container 121.

As is shown in FIG. 2, the pump device 14 is located inside the neck 124 of reservoir 12 as described above and serves to draw the fluid or fluid precursor 22 from the main container 121 of the reservoir 12 and force the fluid out the dispensing end 18 of the dispenser 10. The pump device 14 may be advantageously constructed from widely available "stock" components in order to enhance manufacturing efficiencies. Specifically, pump device 14 is preferably a common lotion pump of the type in widespread use with bottled lotions, shampoos, soaps and the like. Suitable pumps may be purchased from a variety of pump manufactures including, for example Rexam Airspray, Inc., having offices at 3768 Park Central Blvd, North, Pompano Beach, Fla., USA, and Rieke Corporation 500 W. 7$^{th}$ Street, Auburn, Ind., USA. A suitable commercially available pump is the F2 foaming pump available from Rexam Airspray, Inc. Many other models of foam pumps, lotion pumps are also available on the market, and may be utilized depending on variables such as shot size and the like. As will be explained below, a commercially available pump device may be modified in several ways for use in dispenser 10, depending on the application or fluid to be dispensed from the dispenser 10.

To gain a better understanding of an exemplary pump that may be used in the present invention, attention is again directed to FIG. 2. As shown, pump device 16 is a foaming pump and includes an outer tubular piston 62 and an inner tubular piston 64 located inside of a pump cylinder 66. As is shown, the pump cylinder 66 has a wide portion 66W and a narrow portion 66N. The outer tubular piston 62, the wide portion 66W of the pump cylinder 66 and the outer surface of the inner piston 64 form a first chamber 68, which is an air chamber. The inner piston 64 and the narrow portion 66N of the pump cylinder 66 form a second chamber 69, which is the fluid chamber. The pump device 16 further includes a cap element 70, which is maintained in an axially fixed relation with respect to pump cylinder 66. Cap element 70 is advantageously used to mount the pump device 16 within reservoir 12, and as shown, more particularly; to the pump mounting element 20, which is either contained within the main container 121 or the top portion 122 of reservoir. In the illustrated embodiment, for example, pump mounting element 20 is configured as a disc-shaped member having a threaded portion 76. The outer threads of threaded portion 76 are engaged by the inner threads of cap element 70, as shown in FIG. 2. Other suitable means may be used to hold the pump assembly 16 in the reservoir 12.

An engaging element 24 is in communication to the pump's piston assembly 61. Typically, the engaging element will be physically connected to the piston 61. In the illustrated embodiment, engaging element 24 is configured having a cylindrical portion 79, and a disc-shaped flange 80. It is generally the cylindrical portion 79 which is connected to the piston 61 of the pump 14. Typically, the engaging element 24 is generally located near the central axis of the reservoir, which provides advantages discussed below. Reciprocative movement of engaging element 24 will cause piston assembly 61 to move within the pump cylinder 66. Piston assembly 61 is normally urged into an upward position (rest position), shown in FIG. 2, due to the force of a pump recovery means 143. The pump recovery means may be a compressible member or, in an electronic configuration, the motor may be used to recover the pump. Suitable pump recovery means includes a helical spring, as is shown in FIG. 2.

As is stated above, the pump assembly 14 shown in FIG. 2 is a foaming pump. The foaming pump shown mixes the liquid 22 from the main container 121 with air within the pump structure. The outer piston 62 contains air inlet openings 72, which allow air to pass through the outer piston 62 to enter the air chamber 68. In addition, the outer piston 62 is provided with an air exhaust passage 73, which allows the air present in the air chamber 68 to escape the air chamber 68. To prevent air in the air chamber from exiting the air inlet opening 72, a check valve 74 is positioned near the air inlet opening 72 which opens during the charging stage and closes during the discharging stage of the pump 14. This check valve 74 also prevent air and/or fluid from entering the air chamber 68 during the charging stage from the air exhaust passage 73 during the charging stage of the pump. Operation of this check valve is described in more detail in U.S. Pat. No. 5,443,569 to Uehira et al., which is hereby incorporated by reference.

Pump device 16 is further provided with additional check valves 84, 85 and 86 to ensure proper flow of the liquid through the pump. Check valve 86, located at the base of pump cylinder 66, allows the liquid 22 to be drawn into a lower liquid chamber 69, through the inlet 141 of the pump when inner piston 64 moves in an upward direction (charging stage). When inner piston 64 moves in a downward direction (discharging stage), check valve, 85 allows the liquid 22 to be passed into an upper liquid chamber 90 from the lower liquid chamber 69. In addition, check valve 84 allow fluid to exit the upper pump chamber 90 into the mixing chamber 92. Both check valves 84 and 85 are opened at the same time and close at the same time. In the mixing chamber 92, air from the air chamber 68 is mixed with the liquid 22 from the upper liquid chamber 90. The mixing of the air and liquid creates a foam fluid which is forced through a porous member 93. The porous member 93 is in the form of a porous net or screen-like structure to create uniformity in the foam bubbles of the fluid. The fluid is then force through the outlet 142 of the pump 14.

While a variety of different check valve configurations are contemplated, the illustrated embodiment utilizes common ball and seat valves. Other configuration of these elements may be used without departing from the scope of the present invention. Other structures and functional elements, such as seals and gaskets may be used in the pump device to the pump form leaking or improve the function of the pump. Further it is noted that the pump assembly 14 described above is a foaming pump and that non-foaming pumps may also be used in the present invention. Non-foaming pumps work much in the same manner as the foaming pump described above, but are devoid of outer piston, air chamber, air inlet and mixing chamber described above. The liquid is passed through the pump in the same manner as the foaming pump but is not mixed with air prior to leaving the pump outlet 142.

Referring to FIGS. 2, 3 and 4, the fluid leaving the outlet 142 of the pump 14 is transported to the suck back mechanism 16. Generally, the outlet 142 of the pump 14 typically moves with the piston assembly 61. To counter act this movement, the outlet 142 of the pump 14 is joined to the first opening 162 of the suck back mechanism 16 with a flexible tube 96. The flexible tube 96 has a first end 97 attached to the outlet 142 of the pump and a second end 98 attached to the first opening 162 of the suck back mechanism 16. By connecting the outlet 142 of the pump 14 with the suck back mechanism 16 with the flexible tube, the suck back mechanism 16 can be mounted to the pump mounting member 20 in a stationary manner, which will improve the operation of the suck back mechanism 16 during use. As is shown in FIG. 2, the suck back mechanism 16 is mounted on a mount 179.

Attention is directed to FIGS. 5 and 5A, which each show a configuration usable for the suck back mechanism. As is stated above, the suck back mechanism 16 is provided with a first opening 162, which functions as an inlet for the fluid being pumped from the pump 14 into the suck back mechanism 16. The suck back mechanism 16 also has a second opening 163, which functions as an outlet from the suck back mechanism 16 when the pump 14 is in the discharging stage. The second opening 163 also functions as an inlet for a portion of any undispensed fluid between the suck back mechanism 16 and the dispensing end 18 of the dispenser, when the pump 14 is in a charging stage. The suck back mechanism 16 also has at least one resilient member 161, which is capable of drawing a portion of any undispensed fluid between the second opening 162 of the suck back mechanism 16 and the dispensing end 18 into resilient member 161. The function of the resilient member may be independent of the recovery means 143 of the pump 14 or may be aided by the recovery means 143 of the pump 14.

Figure 7:
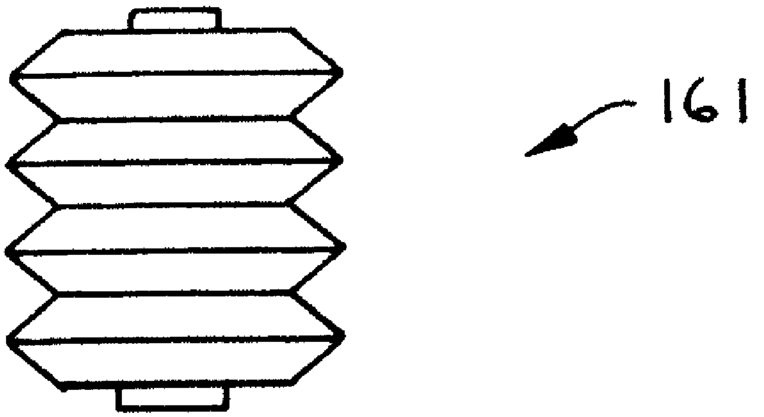
FIG. 7 shows a plan view of a corrugated shaped resilient member.
Figure 8:
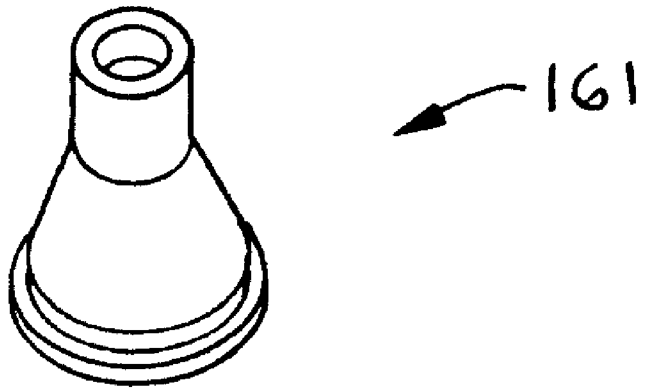
FIG. 8 shows a plan view of a truncated cone shape resilient member.

Generally, there are one or more resilient members 161 in the suck back mechanism. The resilient member(s) 161 are shaped and are prepared from a material which allow the resilient member(s) to be compressed and recover to essentially it same size and shape. Exemplary shapes for the resilient member 161 are shown in FIGS. 7 and 8. FIG. 7 shows a corrugated bellows shape and FIG. 8 shows a resilient member having a truncated cone shape. The resilient member is prepared from an elastomeric material, including for example, natural rubber, a silicone rubber, or any other material which is elastomeric in nature. Alternatively, other resilient materials may be used, so long as the material is capable of recovering from a compressed state. The actual size of the resilient members can be selected by those skilled in the art to create the ideal suction force needed to allow the resilient members to effectively intake the fluid and/or create a desire level of vacuum to effectively draw the fluid into the suck back mechanism. Generally, higher viscosity fluids will require a larger volume in the hollow portions of the resilient members.

In one embodiment is shown in FIG. 5, a plurality of resilient members 161 are used in the suck back mechanism 16. Specifically, two resilient members 161 are shown. As shown, the suck back mechanism 16 has a lower member 164 and an upper member 165, which is joined to the lower member 164. The upper member 165 and the lower member 164 should form an air tight seal when joined together. Additional seals or sealing materials may be used to ensure that combination of the upper and lower members 165 and 164 are air tight. Such seals and sealing members would readily be apparent to those skilled in the art. The upper member 164 has a seat 168 which adapted to create a seal with the resilient members 161. The resilient members 161 may be held in place on the seat 168 with a retainer 166 or any other suitable means to maintain an air tight seal in the suck back mechanism. Typically, the retainer 166 will snap into place onto the upper member 165 to securely hold the resilient members in place during use. Again, the resilient members 161 should create an air tight seal with the upper member 165. If the suck back mechanism 16 does not have an air tight seal, the suck back mechanism 16 may not operate in a proper manner.

In addition to forming an air tight seal, in one embodiment of the present invention, the upper member 164 and lower member 165, when joined together, should create a channel or passage 174. This channel or passage 174 connects the primary fluid passageway 175 through the suck back mechanism 16 to the resilient members 161 and the hollow portion 173 of the resilient member 161, thereby allowing the suck back mechanism to draw a portion of the undispensed fluid into the hollow portion 173 of the resilient members 161. This channel or passage 174 also allows the portion of the undispensed fluid drawn into the hollow portion 173 to exit the hollow portion 173 of the resilient member 161 to be placed back into the primary fluid passageway 175.

Figure 6:
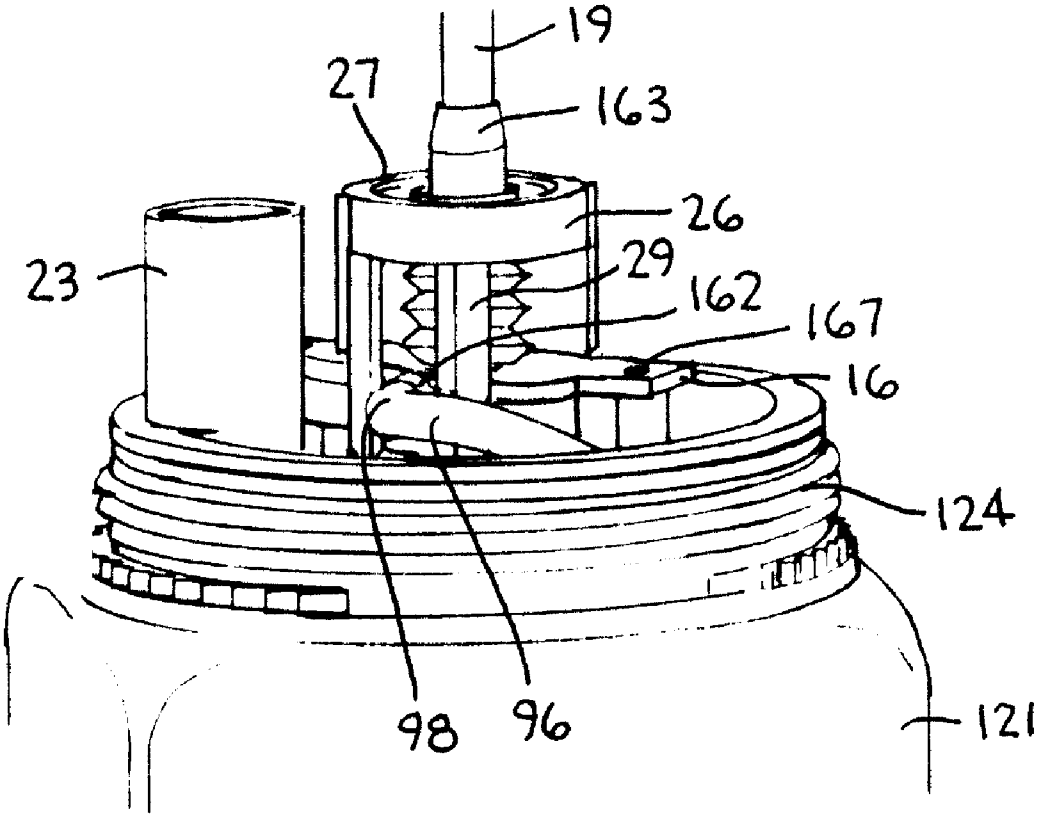
FIG. 6 shows a perspective view of the top portion of the dispenser with the cover removed and having a single resilient member.

In an alternative configuration, a single resilient member 161 may be used in the suck back mechanism 16. When a resilient member 161 is used, it can be formed using a structure shown in FIG. 5, where one of the resilient members is removed and the retainer 166 holds a cap (not shown) or creates a seal with seat 168. Alternatively, a structure similar to that shown in FIG. 5A may be used for the suck back mechanism 16, when a single resilient member 161 is used. As is shown in FIG. 5A, the suck back mechanism 16 has an inlet 162, and an outlet 163. A passageway 171 is created between the inlet 162 and the outlet 163 and the passageway as vents 170, which allow the fluid to pass from the passageway into the resilient member 161. The resilient member 161 should create a seal with the passageway 171 to ensure that the suck back mechanism will operate properly. Other similar structures may be used in the present invention as the suck back mechanism, provided that the structures allow undispensed fluid between the pump and the dispensing end of the dispenser. FIG. 6 is similar to FIG. 3 described herein, except FIG. 6 shows a suck back mechanism of FIG. 5A in use on the reservoir 12.

Generally, the suck back mechanism 16 may be held in the pump mounting element 20 with a suitable mounting means. For example, the suck back mechanism 16 would be provided with mounting structure 167 on the upper member 165 of the suck back mechanism. The mounting structure could be a hole or protrusion which would allow the suck back mechanism 16 to be mounted on a mount 179, which is present on the pump mounting structure 20. The suck back mechanism 16 could be adhered to the mount 179 using an adhesive, or the suck back mechanism 16 could be mechanically attached to the mount 179 using a mechanical mounting means, such as a screw. Any other mechanical mounting means may be used so long as the suck back mechanism 16 is stationary within the pump mounting element 20.

As is shown in FIG. 2, the resilient member 161 is generally hollow structures having an opening 172 located near the portion of resilient member 161 which is to be positioned at or near the seat 168. The hollow portion 173 of the hollow structure allows the resilient member 161 to store the fluid. In addition, the hollow structure of the resilient member is allowed to collapse, thereby forcing the fluid within the reservoir out of the reservoir. As the resilient member 161 returns to its original shape and size, a vacuum is created by the hollow portion 173, which causes the fluid to be refilled in the resilient member.

The fluid exits the suck back mechanism 16 at the second opening 163 and the fluid exits the dispenser 10 through the dispensing end 18 of the dispenser. The dispensing end 18 may be located at a distal end 19D of a tube 19 which is connected to the second opening 163 of the suck back mechanism 16 at a proximate end 19P of the tube 19. This is shown in FIGS. 1 and 2. In an alternative embodiment, the dispensing end 18 may be in the form of a nozzle (not shown in the drawings). Generally, when the tube 19 is present, the tube 19 prepared form a flexible material.

Additional elements which may be present in the dispenser 10 of the present invention include an actuator 26, and an actuator rod 30. The actuator 26 is operable connected to the outer piston 62 of the pump 14, as is shown in FIG. 2. The actuator serves to activate the pump 14, causing the pump to move from a resting stage, shown in FIG. 2, to a discharging stage, moving liquid from the reservoir 12 through the pump 14, suck back mechanism 16 and out of the dispensing end 18 of the dispenser 10. As is shown in FIG. 2, the actuator 26 has a upper structure 27 and a lower structure 28. The upper structure 27 is joined to the lower structure 28 with a connecting side structure 29. Generally there are more than one side structures 29 present in a single actuator 26, so that the upper structure 27 of the actuator and the lower structure 28 work in unison as a single unit. The structure of an actuator usable in the present invention can be further seen in FIGS. 3 and 6. One further element that may be present in a filling port 23, which allows the reservoir 12 to be filed with the fluid.

As can be seen in FIGS. 2, 3 and 6, a lower surface 31 of the upper actuator structure 27 may contact the resilient members 161. By having the actuator 26 contact the resilient member 161, as the actuator is moved from its rest position, as shown in FIGS. 2, 3 and 6 to its depressed position, shown in FIG. 2, the lower surface 31 of the actuator's upper structure compresses the resilient members 161, thereby forcing the fluid present hollow portion from the resilient member 161 into the channel 175 and subsequently out of the dispensing end 18 of the dispenser. The lower surface 31 of the actuator's upper structure 27 may merely contact the resilient member 161 or may be physically joined to the resilient members. Suitable method of joining the lower surface 31 to the resilient member 161 includes, for example, adhesive means, mechanical means or a combination of adhesive and mechanical means. Having the resilient member 161 joined to the lower surface 31 has the advantage that the pump recovery means 143 can be used to assist the resilient member 161 in recovering to its starting shape and size, creating a vacuum to draw the fluid from the dispensing end 18 back towards the suck back mechanism 16. However, it is not necessary to have the resilient member 131 connected to the lower surface 31 of the upper actuator structure 27.

To activate the actuator 26 to dispense the fluid from the dispenser 10, an actuator rod 30 contacts the top surface 32 of the actuator, as is shown in FIG. 2. Alternatively, the actuator rod may be connected to the top surface 32 of the actuator 26. The actuator rod 30 may contact the top surface 32 of the actuator 26 by passing though an actuator opening 130, shown in FIGS. 1 and 3, located in the top portion 122 of the reservoir assembly 12. The actuator opening 130, is generally positioned about the center line of the top portion 122. In one embodiment of the present invention, the tube 19, connecting the dispensing end 18 to the second opening 163 of the suck back mechanism 16, will be centrally located in the actuator opening 130, as is shown in FIG. 1. The actuator opening 130 may be a single opening such that the actuator rod 30 can come into contact with top surface 32 of the actuator 26.

As the actuator rod 30 depresses the actuator 26, the actuator 26 depresses the resilient members 161 and depresses the outer tubular piston 62 and an inner tubular piston 64 of the pump, transitioning the pump 14 from the rest stage to the discharging stage. Depressing the resilient members 161 causes any fluid within the hollow portion 173 to be expelled from the resilient members 161 into the primary fluid passageway 175 and towards the dispensing end 18 of the dispenser. In addition, fluid is expelled from the pump 14 through the outlet 142 of the pump into the flexible tube 96, which carries the fluid to the suck back mechanism 16. The fluid enters the primary passage 175 of the suck back mechanism 16 and joins the fluid expelled from the resilient member 161. The fluid is also expelled from the dispensing end 18 of the dispenser 10. At the end of the actuator's 26 depressing the resilient member 161 and the pistons of the pump, the pump recovery means 143 causes the pump to transition from the discharging stage to the charging stage. During the charging stage of the pump 14, the actuator 26 is returned to its rest position, shown in FIG. 2, which in turn allows the resilient member 161 to return to its original shape from a compressed state. As the resilient member 161 is returned to its original shape, a vacuum is created, causing a portion of any undispensed fluid between the suck back mechanism 16 and the dispensing end 18 to be drawn back into the resilient member 161. It is this vacuum created and the drawing of the portion of the undispensed fluid into the resilient member 161, prevents the problems of stringing and dripping from the dispensing end 18 of the dispenser.

Figure 9:
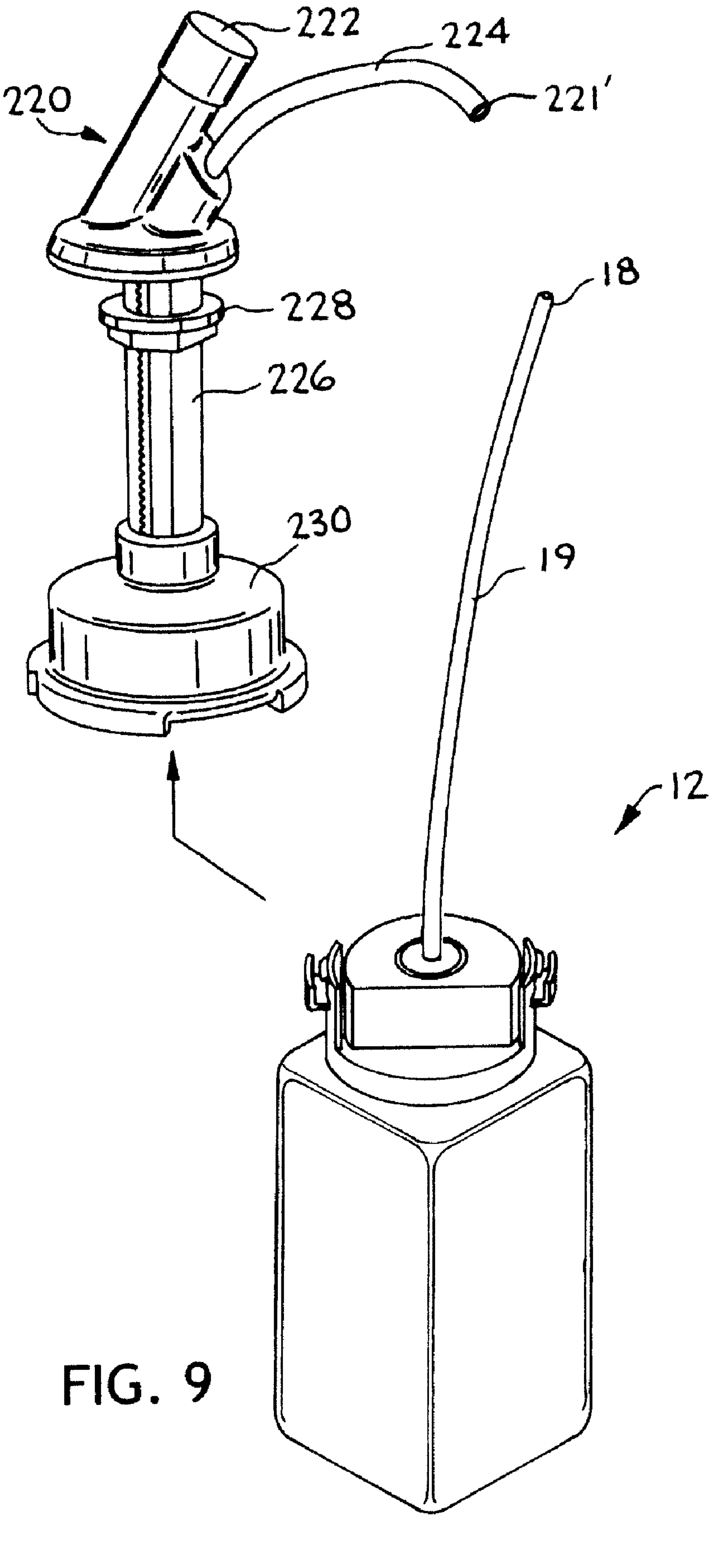
FIG. 9 shows a dispenser of the present invention in an in-counter configuration.

The dispenser 10 of the present invention may be used as an under-counter dispenser, such as the one shown in FIG. 9. When used as an under-counter dispenser, the actuator rod 30 may be manually activated by a user, by having the end of the actuator rod 30 opposite the actuator operably connected or in contact with an actuation button 222. As the actuation button 222 is depressed by the user, the actuator rod depresses the actuator 26, which in turns activates the pump 14 and suck back mechanism 16 as stated above. Typically, the actuator button 222 is located on a dispensing head 220. The dispensing head 220 also has a delivery spout 224. Holding the dispensing head 220 to the counter (not shown) is a anchoring mechanism 228, which is associated with a portion of a generally hollow elongated tube 226 which extends below the counter. In the hollow portion of the elongated tube 226 is the actuator rod 30. At the end of the elongated tube 226 opposite the dispensing head 220 is a connecting member 230. The dispenser has complementary connecting members 40 located on the dispenser 10, which serve to connect the dispenser to the dispensing head 220 and/or the elongated tube. In this configuration, the tube 19 is inserted through the connecting member 230, through the elongated tube 228 and into the delivery spout 224 so that the dispensing end is at or near the end 221' of the delivery spout. In the configuration shown in FIG. 9, the dispenser is manually operated by the user.

Figure 10:
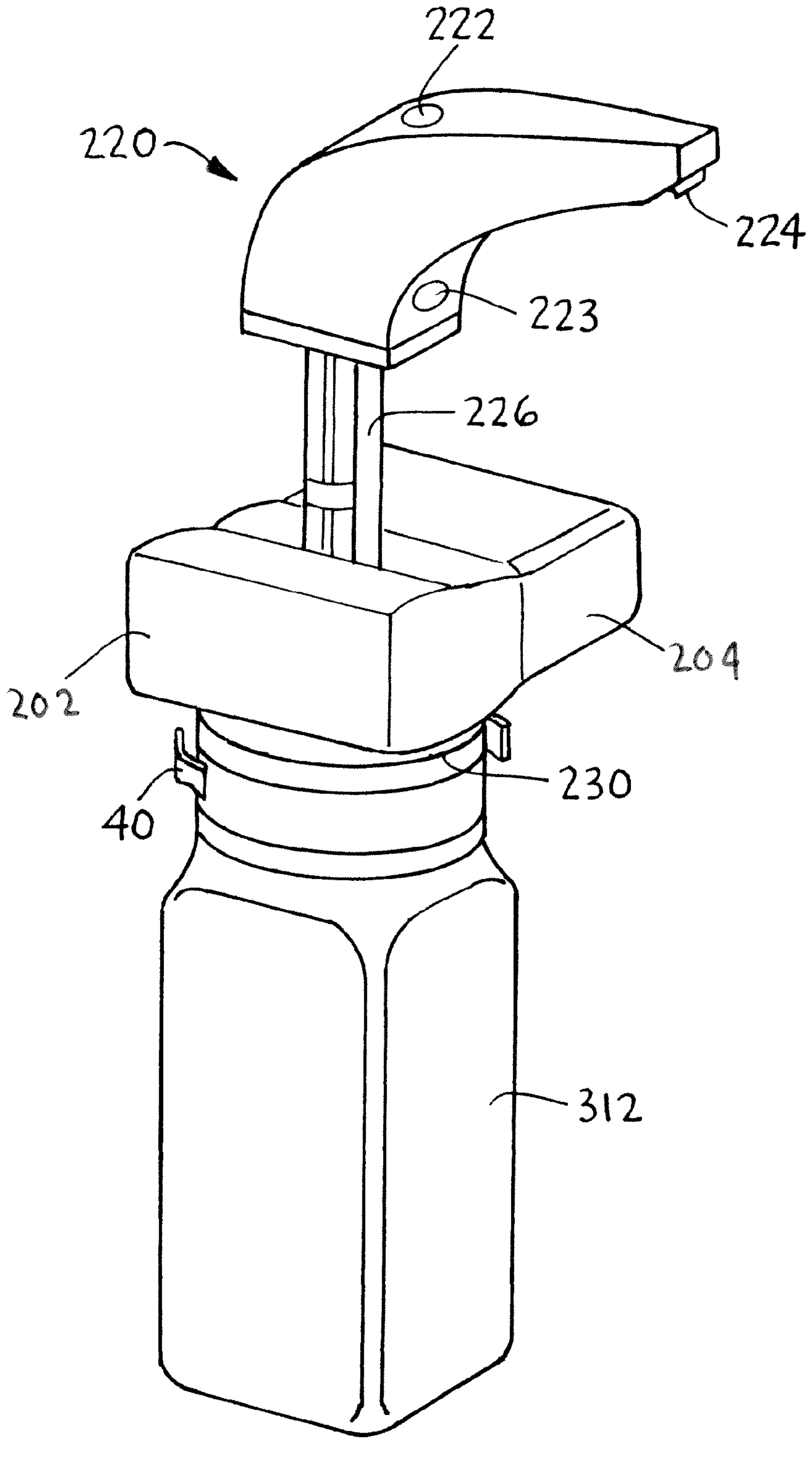
FIG. 10 shows a dispenser of the present invention with a motor and power supply.

In an alternative embodiment of the present invention, the pump 14 and suck back mechanism 16 is electronically activated. An example of an electronic viscous liquid dispensing system is shown in FIG. 10. An electronically activated pump may operate in many different ways. One way is to have a user push an actuation button 222 located on or near the dispensing head or to provide a sensor 223 which would detect the users hands under the spout 20. When used as an electronic activation of the pump, the actuation button may be a push button, a sensor or any other means known to those skilled in the art to electronically activate the pump.

As can be seen in FIG. 10, the electronic viscous liquid dispensing system has a dispensing head 220, and elongated tube 226, a motor housing 202, a power pack housing 204, a connecting member 230 and a reservoir assembly 12. Essentially the components are similar or are the same as described above with the exception that the motor housing 202 is positioned between the elongated tube 226 and the connecting member 230. In addition the power pack housing 204 contains a power supply which is electrically connected to a motor. The dispensing head 220 has an actuator button 222, and/or a sensor 223 which is used to activate a motor which engages the pump 14 by the actuator rod 30 and the actuator. The actuator button 222 and/or the sensor 223 are electrically connected to the motor. Generally, the actuator button 222 and/or the sensor 223 are electrically connected to a control panel (not shown) having control circuitry which is used to detect a user's hand near under the spout 224, or the user's input to the actuator button 222. In addition, the control circuitry is used to activate the motor for a given period of time so that the user receives a dose of the viscous liquid. Control circuitry for sensors and buttons is known to those skilled in the art and is shown, for example in U.S. Pat. No. 6,929,150 to Muderlak et al., which is hereby incorporated by reference.

In the electronic viscous liquid dispensing system, the connecting member 230 may be connected to the motor housing 202 and power supply housing 204. Alternatively, the motor housing 202 may be integral with the connecting member 230, meaning that the motor housing 202 and connecting member 230 are a single unit. Typically, the power supply 204 may be separated from the motor housing so that the power supply may be replaced when needed. That is, the power supply is disconnectable and reconnectable to the motor housing. To ensure that power is transferable from the power supply 204 to the motor housing, electrical contact points may be used on both the motor housing and power supply, such that the electrical contact points are in complementary positions, meaning that when power supply is attached to the motor housing an electrical connection is made.

Figure 11A:
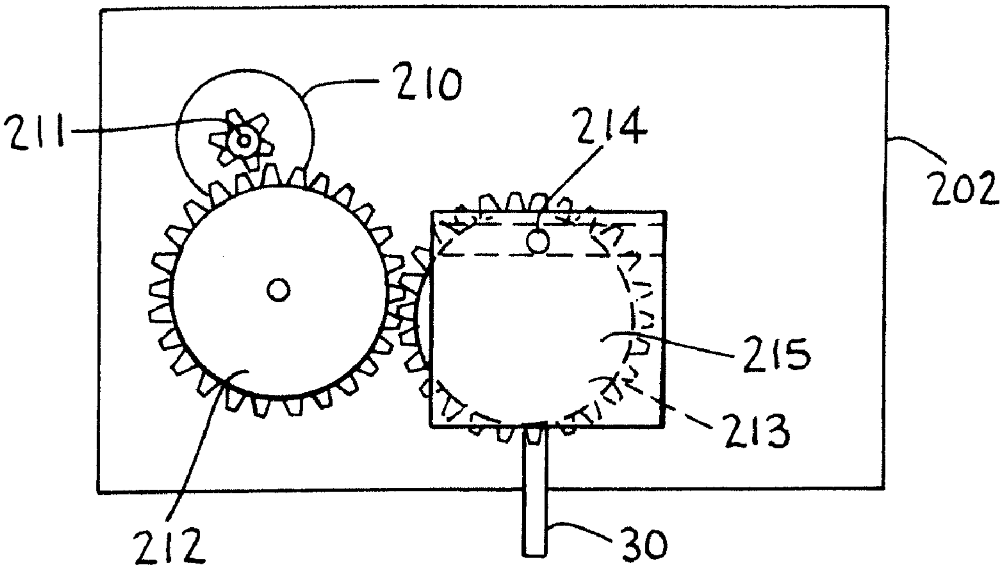
FIG. 11A shows a front view of a motor power transmission system usable in the present invention.

To gain a better understanding of a possible configuration of the motor housing 202, attention is now directed to FIGS. 11A, B, C and D. The motor housing 202 houses a motor 210, gears 211, 212 which are engaged with motor 210 and an additional gear 213 which drives an actuator rod 30. The motor driven actuator rod 30 is housed in the motor housing 202 and extends from the motor housing 202 through an opening present in the lower surface of the connecting member 230. Any method may be used to drive the motor driven actuator rod 30. In a typical operation of the electronic viscous liquid dispensing system, the motor driven actuator rod 30 contacts the actuator 26 and pushes the actuator downward to activate the pump 14 one or more times to expel a dose of the viscous liquid from the spout 224 of the dispensing head 220.

Numerous ways may be used to transfer power from an activated motor to the motor driven actuator rod 30. For example, the motor may drive a series of wheels, gears or other energy transmission means to the actuator rod 30 which extends and contacts the actuator 26. In one embodiment of the present invention, which is intended to be an exemplary means that may be used to drive the actuator rod 30, the drive wheel 213 has a post or shaft 214 extending from one area of the gear body near the periphery 215, as is shown if FIG. 11A and 11B. As the motor 210 turns the motor drive wheel 211, the motor drive wheel 211 in turn rotates one of more wheels 212. In FIG. 11A, a single wheel 212 is shown; however, it may be desirable to have more wheels to reduce the rotational speed of the actuator drive wheel 213, so the pump is activated in a controlled manner. It is within the skill of those skilled in the art to select the ratio of drive wheel so that the appropriate speed is achieved of the actuator drive wheel 213. It is noted the term "wheel", as used herein is intended to cover any wheel like mechanism, including wheels per se and other wheel-like mechanisms such as gears. Generally, gears are desirable, since gears are less likely to slip during use.

Figure 11B:
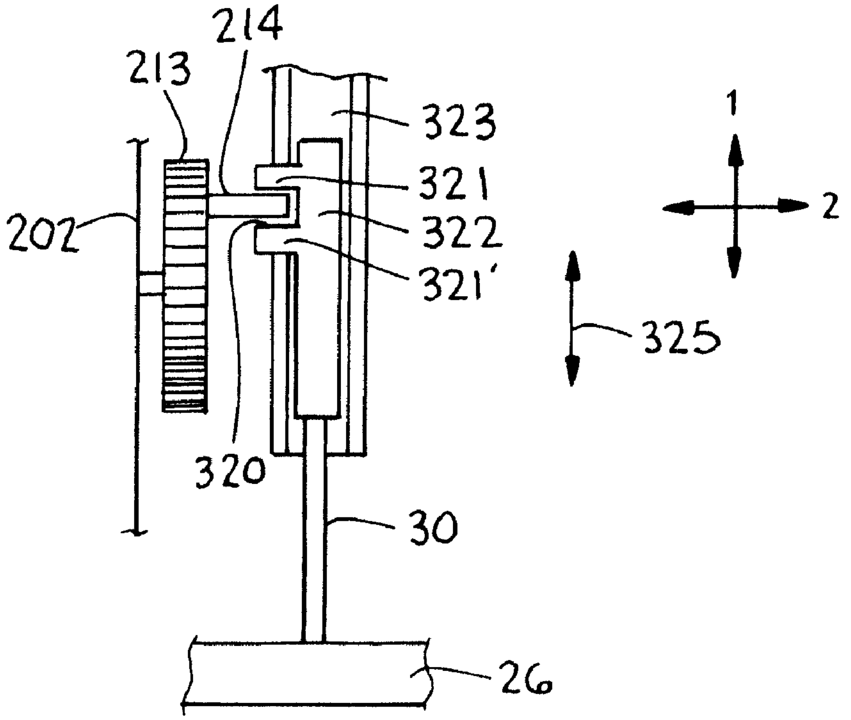
FIG. 11B shows a side view of an actuator drive wheel and an actuator guide member of an embodiment of the present invention.

As is shown in FIG. 11B, the actuator drive wheel 213 has a shaft 214 extending from a non-central area of the actuator drive wheel 213, which makes the shaft rise and lower in the direction 325 as the actuator drive wheel 213 turns. This shaft 214 is fitted into a horizontal channel 322 present in the actuator guide member 320. The horizontal channel 322 is generally in the horizontal axis 2. The horizontal channel 322 is created by two horizontal protrusions 321 and 321' extending from one of the sides of the actuator guide member 320.

Figure 11D:
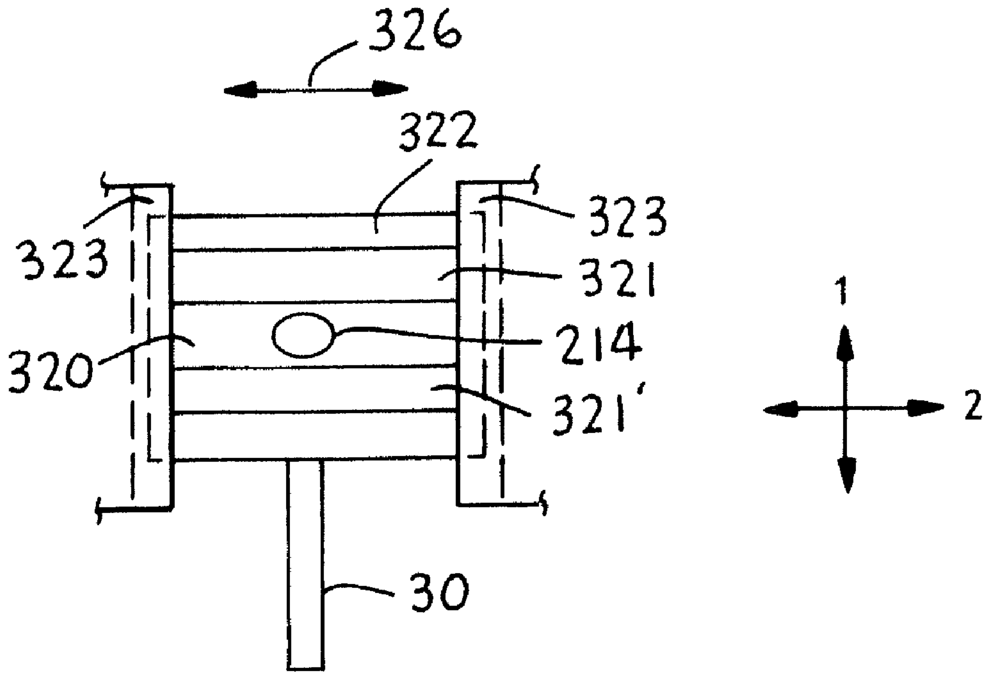
FIG. 11D shows a top view of a motor power transmission system embodiment usable in the present invention.
Figure 11C:
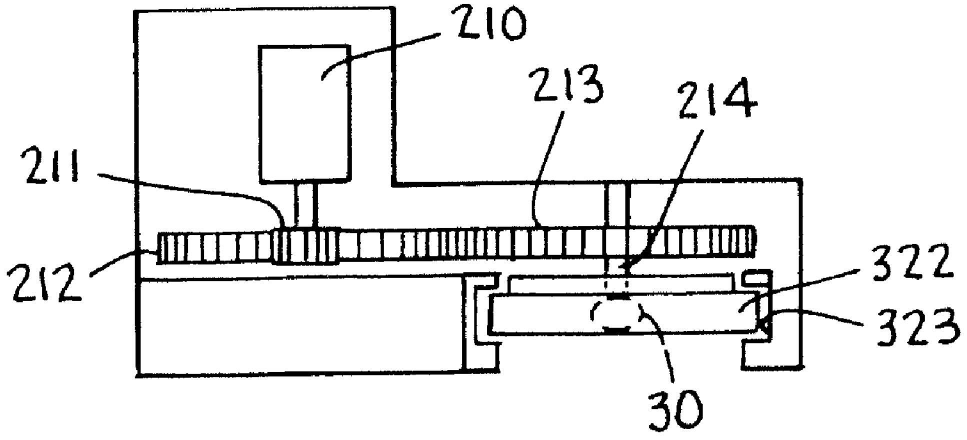
FIG. 11C shows a back side view of an actuator guide member of an embodiment of the present invention.

As the actuator drive wheel turns, the shaft 214 travels in a circular path and has a vertical movement 325 in the vertical axis 1, shown in FIG. 11B and a horizontal movement 326 in the horizontal axis 2, shown in FIG. 11C. The vertical movement 325 of the shaft 214 causes the actuator guide member 320 to move up and down in the vertical axis 1, which in turn moves causes the motor driven actuator rod 30 to also move in an up and down manner in the vertical axis. Below the channel 322 present on the actuator guide member 320 is the actuator rod 30. The actuator guide member 320 is held in place so that the movement of the actuator guide member is in an up and down manner in the vertical axis and not side to side or front to back. The actuator guide member 320 may be held in place, for example by providing vertical guide slots 323 so that the lateral sides of the actuator guide member 320 are held in place on the horizontal axis. These vertical guide slots 323 maybe provided in the motor housing 202 as is shown in FIGS. 11B, 11C and 11D.

As is mentioned above, the shaft 214 also has a horizontal movement 326 in the horizontal axis 2. This horizontal movement is essentially unwanted. To account for the horizontal movement, the shaft is allowed to move horizontally in the horizontal axis 2 along the channel 322 in the actuator guide member. Therefore, the channel 322 controls the essentially unwanted horizontal movement 326 of the shaft 214.

The electrical powered viscous liquid dispensing systems may also have additional features. For example, dispensing head 220 may have indicator lights to signal various events, such as, recognition of a user, low battery, empty soap reservoir, or other conditions such as a motor failure. Examples of such lights include low power consumption lights, such as LED (light emitting diodes).

The power source for the electronic viscous liquid dispensing system of the present invention may include disposable DC batteries (not shown). Alternatively, the power supply may be a closed system which requires that the entire power supply be replaced as a single unit. Although not shown in the figures, an AC to DC adapter may be utilized to provide an alternate source of power to the viscous liquid dispenser. This embodiment may be particularly useful wherein the viscous liquid dispenser is mounted in close proximity to an AC outlet or when it is desirable to power multiple dispensers from a centrally located transformer of suitable configuration and power. The number of batteries used to power the motor will depend on the motor selected for the dispenser. Disposable batteries usable in the present invention include 9 volt batteries, 1.5 volt batteries, such as D-cell or C-cell batteries, or other similar batteries. The exact type of battery selected for use is not critical to the present invention so long as the power supplied to the motor is compatible for the motor. For applications where the viscous liquid dispenser will be used under low usage situations, rechargeable batteries could be used. If the dispenser is to be used in a bright light situation, the batteries could be solar rechargeable batteries.

Although the present invention has been described with reference to various embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

The invention claimed is:

1. A dispenser for dispensing a fluid said dispenser comprising:

a reservoir for holding a fluid;

a pump in communication with the reservoir, the pump comprises an inlet, an outlet and a recovery means, wherein the pump has an idle stage, a discharging stage in which a shot of the fluid is expelled from the pump through the outlet; a charging stage in which a shot of the fluid is drawn from the reservoir through the inlet into the pump and the recovery means returns the pump to the idle stage from the discharging stage and through the charging stage;

a suck back mechanism which is separate from the pump, said suck back mechanism comprising a resilient member capable of storing fluid, a first opening and a second opening, the first opening being connected to the second opening by a passageway, and at least one vent is located in the passageway, said vent allows a fluid to leave the passageway and enter the resilient member capable of storing fluid, wherein the resilient member capable of storing fluid is positioned between the first opening and the second opening and the first opening of the suck back mechanism is connected to the outlet of the pump; and a dispensing end for dispensing the fluid from the dispenser, the dispensing end being connected to the second opening of the suck back mechanism, whereby at the end of the discharging stage of the pump, undispensed fluid remains between the dispensing end and the second opening of the suck back mechanism and a portion of the undispensed fluid is drawn into the resilient member capable of storing fluid.

2. The dispenser according to claim 1, wherein the recovery means of the pump is a compressible member.

3. The dispenser according to claim 2, wherein the compressible member comprises a spring.

4. The dispenser according to claim 1, wherein during the pump's discharging stage, an external force is applied to the resilient member, the external force compresses the resilient member causing the portion of fluid present in the resilient member to be discharged from the resilient member into the passageway, thereby refilling the dispenser between the second opening of the suck back mechanism and the dispensing end while the shot of fluid present in the pump is expelled through the outlet of the pump.

5. The dispenser according to claim 1, wherein the drawing of the portion of the fluid located between the dispensing end and the second opening of the suck back mechanism into the resilient member occurs simultaneously with the charging stage of the pump.

6. The dispenser according to claim 1, further comprising a pump outlet tube, the pump outlet tube connects the pump outlet to the first opening of the suck back mechanism.

7. The dispenser according to claim 1, wherein the resilient member capable of storing fluid is prepared from an elastomeric material.

8. The dispenser according to claim 7, wherein the resilient member capable of storing fluid has a corrugated shape or a truncated cone shape.

9. The dispenser according to claim 1, wherein the suck back mechanism comprises a single resilient member.

10. The dispenser according to claim 1, wherein the resilient member capable of storing fluid is a hollow member, the hollow portion of the hollow member is capable of holding a fluid.

11. A dispenser for dispensing a fluid said dispenser comprising:

a reservoir for holding a fluid;

a pump in communication with the reservoir, the pump comprises an inlet, an outlet and a recovery means, wherein the pump has an idle stage, a discharging stage in which a shot of the fluid is expelled from the pump through the outlet; a charging stage in which a shot of the fluid is drawn from the reservoir through the inlet into the pump and the recovery means returns the pump to the idle stage from the discharging stage and through the charging stage;

a suck back mechanism which is separate from the pump, said suck back mechanism comprising a resilient member capable of storing fluid, a body comprising the first opening, the second opening, a primary fluid passageway between the first and second opening, the primary passageway connecting the first and second openings to one another, and at least one secondary passageway having a first end and a second end, the resilient member being located at the second end of the secondary passageway and the first end of the secondary pathway being located along primary fluid pathway such that the fluid can be drawn into the resilient member capable of storing a fluid from the primary passageway and through the secondary passageway wherein the first opening of the suck back mechanism is connected to the outlet of the pump; and a dispensing end for dispensing the fluid from the dispenser, the dispensing end being connected to the second opening of the suck back mechanism, whereby at the end of the discharging stage of the pump, undispensed fluid remains between the dispensing end and the second opening of the suck back mechanism and a portion of the undispensed fluid is drawn into the resilient member capable of storing fluid.

12. The dispenser according to claim 11, wherein the suck back mechanism comprises a plurality of resilient members capable of storing fluid.

13. The dispenser according to claim 12, wherein the suck back mechanism comprises two resilient members.

14. The dispenser according to claim 11, wherein there are two secondary pathways and a resilient member capable of storing fluid is located at the second end of each of the secondary pathways.

15. The dispenser according to claim 11, wherein the pump further comprises a housing having a fluid chamber comprising an interior wall, a piston positioned within the fluid chamber and the piston being telescopingly movable within the fluid chamber, said piston creating a seal with the interior wall of the fluid chamber, an inlet valve located at or near the inlet of the pump, and an outlet valve located at or near the outlet of the pump.

16. The dispenser according to claim 15, wherein the housing further forms a second chamber having an interior wall, the piston is telescopingly movable within the second chamber and creates a seal with the interior wall of the second chamber, said second chamber having a second inlet and a second outlet, wherein the second outlet is located at or near the outlet of the pump and the second inlet is positioned within the pump such that it is on a side of the pump which does not come into contact with the fluid within the reservoir.

17. The dispenser according to claim 16, wherein the second inlet of the pump is an air inlet, which is adapted to allow atmospheric air to enter the second chamber of the pump, but will not allow atmospheric air in the second chamber to escape through the second inlet.

18. The dispenser according to claim 11, wherein the recovery means comprises a spring;

during the pump's discharging stage, an external force is applied to the resilient member, the external force compresses the resilient member causing the portion of fluid present in the resilient member to be discharged from the resilient member thereby refilling the dispenser between the second opening in the suck back mechanism and the dispensing end while the shot of fluid present in the pump is expelled through the outlet of the pump;

the drawing of the portion of the fluid located between the dispensing end and the second opening of the suck back mechanism occurs simultaneously with the charging stage of the pump;

the pump further comprises a housing which has a fluid chamber comprising an interior wall, a piston positioned within the fluid chamber and the piston being telescopingly movable within the fluid chamber, said piston creating a seal with the interior wall of the fluid chamber, an inlet valve located at or near the inlet of the pump, and an outlet valve located at or near the outlet of the pump.

19. The dispenser according to claim 18, wherein there are two secondary passageways and a resilient member is located at the second end of each of the secondary passageways.

20. The dispenser according to claim 19, wherein the resilient member capable of storing fluid has a truncated cone shape.

21. The dispenser according to claim 11, wherein the resilient member capable of storing fluid is a hollow member, the hollow portion of the hollow member is capable of holding a fluid.

* * * * *